Aug. 25, 1931. V. L. CALHOUN 1,820,777
LAWN MOWER GRINDER
Filed Jan. 31, 1929 2 Sheets-Sheet 1

Inventor
Van L. Calhoun
By Wilkinson & Giusta
Attorneys

Aug. 25, 1931.  V. L. CALHOUN  1,820,777
LAWN MOWER GRINDER
Filed Jan. 31, 1929  2 Sheets-Sheet 2
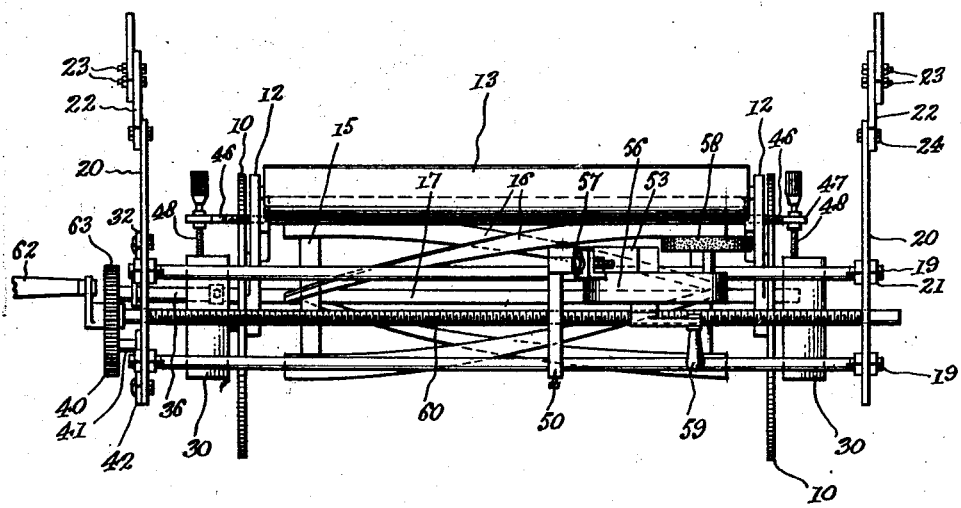
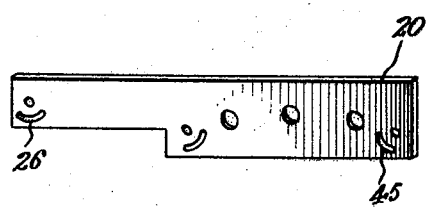
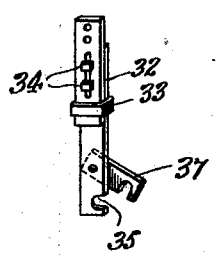
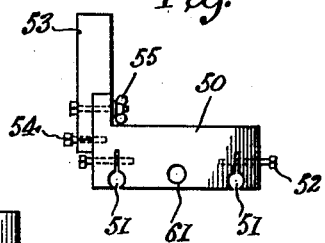
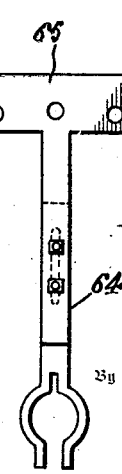
Inventor
Van L. Calhoun
Wilkinson & Giusta
Attorneys Patented Aug. 25, 1931

1,820,777

UNITED STATES PATENT OFFICE

VAN LEONARD CALHOUN, OF BATON ROUGE, LOUISIANA

LAWN MOWER GRINDER

Application filed January 31, 1929. Serial No. 336,598.

The present invention relates to machines or device for grinding and sharpening lawn mowers and the like, and an object of the invention is to provide a device of this character which may be quickly and easily mounted upon a lawn mower so that the frame of the lawn mower may support the grinding device and the latter be operated for not only feeding a grinder across the blades, but also to turn the reel or blade holder.

Another object of the present invention is to provide a grinder or sharpener of this character which may be used in conjunction with grinders or sharpeners for knives and the like which are used in the household, machine shops and the like.

Another object of the invention is to provide a grinding or sharpening machine of this character which may be applied to lawn mowers and connected to the reel thereof so as to operate the latter in a predetermined rate of rotation with respect to the feeding of the grinding element lengthwise of the blade, and to provide means for quickly disengaging the blade carrying reel so that the grinder may be returned to normal position, or to one side of the lawn mower frame.

Another object of the invention is to provide an improved carriage or traveller which has an adjustable stock or other suitable device to which the commercial hand grinder may be quickly and easily applied, and with respect to which the grinder may be secured in adjusted position.

Another feature of this invention is to provide a carriage which may carry the ordinary commercial grinder so that the latter may be operated independently of the movement of the carrier or the rotation of the blades of the lawn mower so that the desired speed of the grinder wheel may be obtained according to the condition of the blade being sharpened.

A further, and very important feature of the present invention, is to provide a sharpener or grinding attachment of this character which comprises relatively few parts which may be easily and quickly assembled, and which may be easily and quickly applied to a lawn mower frame; providing a structure which is economical and one which may be easily and quickly applied to a lawn mower and removed therefrom.

The above, and various other objects and advantages of this invention will be in part described in, and in part understood from, the following detailed description of the present preferred embodiment, the same being illustrated in the accompanying drawings, wherein:

Figure 3 is a top plan view of the same.

Figure 4 is a detail perspective view, enlarged, of one of the bracket plates employed.

Figure 5 is a detail perspective view of one of the adjustable links employed for supporting the bracket plate.

Figure 6 is a detail side elevation of the carriage or traveller, and

Figure 7 is a side elevation of a modified form of combined bracket plate and bracket arm.

Figure 1:
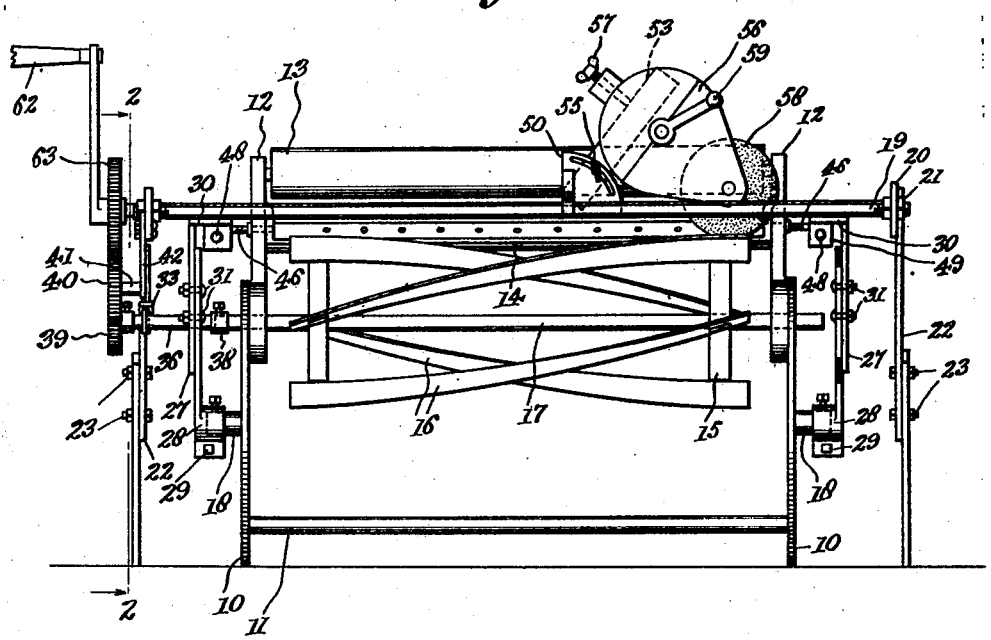
Figure 1 is a side elevation, partly in sections, of a lawn mower frame having certain parts removed and disposed in inverted position with the sharpener of this invention applied thereto.

Referring now to the drawings, the lawn mower to which the invention may be applied, is of conventional form, and the invention may of course be readily applied to lawn mowers of different construction and different sizes.

In the present instance, the lawn mower is disclosed as being in inverted position and with the wheels and power transmission gears removed. In the present instance the frame of the lawn mower comprises the end disks 10 connected together at one side by a cross rod 11, and having at its opposite side frame arms 12 between which the ground roller 13 is mounted, and between which is also mounted the fixed blade or cutter 14.

The reel 15 is of the usual form provided with spirally arranged blades 16. The reel 15 is mounted on a shaft 17 which has bearing in and extends beyond the opposite end disk 10, and the projections of the shaft 17 are taken advantage of in the application of the present attachment to the lawn mower.

The disks 10 are provided in the usual manner with the stub shafts 18 which project from the opposite outer sides of the disks 10 and are employed for supporting the ground or power wheels of the mower.

The invention comprises a track frame which has a pair of rods 19 which are secured in spaced parallel relation 20 through which the opposite ends of the rods 19 project, and against the opposite sides of which binding nuts 21 engage. The bracket plates 20 are projected at one end beyond the track frame and are provided upon such ends with adjustable supporting legs 22.

Figure 2:
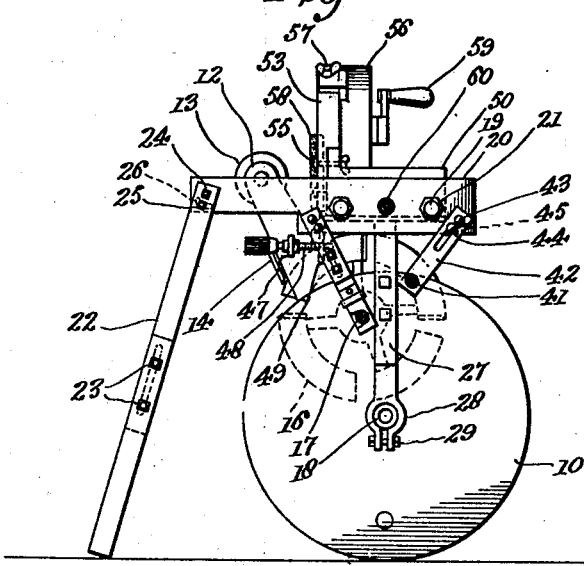
Figure 2 is an end elevation of the same, part being shown in section along the line 2—2 of Figure 1.

As shown particularly in Figure 2, the attachment is adapted to be secured to the upper part of the lawn mower frame when inverted, and the supporting legs 22 are adapted to extend downwardly at one side of the lawn mower for holding the bracket plates in substantially horizontal position. Each leg 22 comprises a pair of slideably connected sections held in adjusted position by clamping bolts 23 and pivotally mounted on pins 24 carried by the bracket plates 20.

Each leg 22 is adapted to be adjusted into an outwardly inclined position by a clamping bolt 25 which is carried by the leg 22 and engages in an arcuate slot 26 which is formed in the end of the adjacent bracket plate 20.

The track frame is provided at opposite ends each with a bracket arm 27. The inner end of each arm 27 is provided with a split socket 28 adapted to embrace a stub shaft 18, and to be clamped thereon in adjusted position by a bolt 29 or the like. The outer end of each bracket arm 27 terminates in a substantially flat plate 30 which is welded or otherwise suitably secured across the under sides of the rods 19 inwardly of the bracket plates 20. The bracket arms 27 are adjustably held as to length by clamping bolts 31 or the like. For the purpose of holding the bracket plates 20 in substantially horizontal position above the frame of the lawn mower, adjustable links 32 are provided. This comprises two flat bars with their ends arranged in overlapping relation and a strap or guide piece 33 secured to one of the bars and through which the other bar is adapted to freely slide.

One bar is slotted, and the other bar carries clamping bolts 34 to secure the sections in adjusted position. One of the sections of the link 32 is adapted to be riveted or otherwise suitably secured to the bracket plate 20 while the other section is provided in one side with a recess or socket 35 adapted to engage over an extension 36 of the reel shaft 17. A pivoted plate 37 is carried upon the links 32 and adapted to engage over the opposite side of the shaft extension 36 and cooperate with the socket 35 for holding the links firmly to the shaft extension 36.

The shaft extension 36 is provided at one end with a socket 38 adapted to engage over the outer end of the reel shaft 17 and is secured thereto by a set screw or the like. The other end of the extension shaft 36 is provided with a pinion 39 adapted to mesh with a gear wheel 40 which is carried upon a pin or shaft 41 mounted on the outer end of a bracket arm 42. The bracket arm 42 is secured to the bracket plate 20 by a pin 43 and is adapted to swing on the pin into and out of engagement with the pinion 39.

The bracket arm 42 carries a clamping bolt 44 which projects through an arcuate slot 45 in the bracket plate to admit free adjustment of the arm 42 and the clamping of the same in adjusted position.

The frame arms 12 are provided with the usual apertures for the adjusting screw of the fixed blade, and these apertures are utilized for the support of removable screw rods 46 having heads 47 provided with threaded apertures to adjustably receive therethrough the threaded end of adjusting screws 48. The adjusting screws 48 are swiveled or otherwise suitably carried in downwardly extending lugs 49 which may be carried by the slot plates 30 and which register with the heads 27. The adjusting screws 48 are provided with handles upon their outer ends to admit of the easy turning of the screw so as to adjust the track frame toward and from the fixed blade 14 of the lawn mower, and consequently with respect to the reel 15 and the cutting blade 16 carried thereby.

Slideably mounted upon the track rods 19 is a carriage or traveller 50. The carriage 50 comprises a block which extends transversely of the rods 19 and which is provided near its opposite ends with transversely extending split sockets or apertures 51 for slideably receiving the rods 19 therethrough. Binding screws 52 are threaded in the opposite ends of the locks 50 and through the split portions of the sockets 51 so as to contract or admit of the expansion of the socket openings to secure the desired engagement of the carriage 50 upon the rods 19. The carriage 50 is provided at one side with a stock or bar 53 pivoted to the carriage 50 at 54 and having a set screw 55 which engages the carriage 50 for adjustably supporting the stock 53 at the desired angle. The stock 53 is adapted to support an ordinary commercial grinder 56, the stock 53 adapted to fit in the socket of the grinder in lieu of the edge of a work bench, a table or the like, and to be secured through the grinder 56 by the set screw or wing nut 57 of the grinder. The grinder 56 is provided with the usual grinding wheel 58 which is held in position to engage the edge portions of the blades 16 when the grinder 56 is adjusted upon the carriage by the above described parts.

The grinder 56 is also provided with a handle 59 in the usual manner by means of which the grinding wheel 58 is rotated, and the position of the grinder 56 as above disclosed is such that the handle 59 may be freely turned by one hand.

The carriage 50 is adapted to be fed back and forth from end to end in the track frame, and for accomplishing this purpose, a threaded shaft 60 is journalled at opposite ends in the bracket plates 20, and preferably in a position between the rods 19. The carriage 50, as shown in Figure 6, is provided between the sockets 51, with a threaded opening through which the shaft 60 may be threaded and by means of which the carriage 50 is slid lengthwise of the rods 19. The shaft 60 extends beyond one of the bracket plates 20 and is provided upon its outer end with a handle 62 of crank form or the like by means of which the shaft 60 may be manually turned. The shaft 60 is also provided, near the handle 62, with a gear wheel 63 which is adapted to mesh with a gear wheel 40 and to rotate the latter so as in turn to rotate the pinion 39 and thus drive the reel 15.

Where it is desired to provide a device of this character for use in a shop or the like where lawn mowers of different sizes are to be ground and sharpened, the combined bracket arm and bracket plate of Figure 7 may be substituted in the structure for the bracket plate 20 and the bracket arm 27. In Figure 7 the bracket arm 64 is of the same structure as the bracket arm 27 with the exception that the upper end of the bracket arm 64 is provided with a key head in the form of a slot plate of the construction and size of the bracket plate 20, as shown at 65 in Figure 7. The plate 65 is adapted to project upwardly at right angles to the track bars 19 and in line with the bracket arm 64. The plate 65 is provided with end and intermediate openings for the reception respectively of the track bars 19 and the threaded shaft 60. The binding nuts 21 of the track bars 19 are secured against the opposite sides of the bracket plate 65 in the same manner as is shown to advantage in Figure 3. By adjusting the binding nuts 21 lengthwise of the rods 19, the bracket plate 65 may be moved toward or from each other along the track bars 19 so as to vary the length of the device and so as to bring the bracket 64 into correct alignment with the stub shaft 18 of lawn mowers of different lengths.

The use and operation of the sharpener is as follows:

The bracket arms 27 are secured by means of their split sockets 28 to the stub shafts 18 of the lawn mower. As above explained, the wheels and gears are removed from the lawn mower and the latter is turned over and is supported upon the forward edges of the frame disks 10, as shown to advantage in Figure 2. The bracket arms 27 hold the frame track horizontally at the upper side of the lawn mower and the links 32 are adjusted, and the extension shaft 36 is also adjusted into position on the end of the reel shaft 17. An ordinary commercial grinder 56, which is used for sharpening knives, tools and the like, is secured to and adjusted upon the stock or bar 53 of the carriage so as to dispose the grinding wheel 58 in the desired position with respect to the blades 16 of the cutting reel of the lawn mower.

The grinder 56 is operated in the usual manner by turning the handle 59 while the handle 62 is rotated so as to feed the carriage back and forth over the frame track while at the same time causing the reel 15 to rotate.

The gear wheels 39, 40, and 63 are so proportioned as to cause the reel 15 to spin at the desired speed of rotation with respect to the feed of the carriage.

By adjusting the hand screws 48 the track frame of the device may be moved toward and adjacent to the fixed blade or cutter 14 of the lawn mower so that the latter may be sharpened by the grinder 56. In this instance, the bracket arm 42 may be swung into a position to move the gear wheel 40 out of engagement with the gear wheels 39 and 63 so that the reel 15 need not be turned. The legs 22 may of course be adjusted to the desired angle and desired height so as to support the bracket plates 20, which form the ends of the track frame, at the desired angle and height according to the adjustment desired and the type of lawn mower, and size of mower to which the present attachment may be connected.

It is of course understood that various changes and modifications may be made in the details of construction and design of the above specifically described embodiment of this invention, without departing from the spirit thereof, and being restricted only by the scope of the following claim.

What is claimed is:

In a lawn mower sharpener, a pair of track rods, bracket plates mounted across the opposite ends of said rods, bracket arms adapted for attachment to a lawn mower and engaging said rods for supporting the same across one side of the lawn mower, adjustable legs carried by said bracket plates for engaging the ground to support the track rods in a definite position of adjustment, means for adjusting said bracket plates with respect to the fixed blade of the lawn mower, and for detachable connection with the shaft of the cutting reel of the lawn mower, an extension shaft for connection with the end of said cutting reel shaft, adjustable links between the extension shaft and the adjacent bracket plate, a gear on said extension shaft, a second gear carried by the adjacent bracket plate and adapted to engage the first gear, a feed shaft mounted in said bracket plates between said rods and having a gear thereon meshing with said second gear, a handle for turning the feed shaft, a carriage mounted on said rods and engaging said feed shaft for operation thereby, and a tool grinder mounted on the carriage.

VAN LEONARD CALHOUN.